United States Patent [19]

Lachman et al.

[11] Patent Number: 4,657,880

[45] Date of Patent: Apr. 14, 1987

[54] PREPARATION OF HIGH SURFACE AREA AGGLOMERATES FOR CATALYST SUPPORT AND PREPARATION OF MONOLITHIC SUPPORT STRUCTURES CONTAINING THEM

[75] Inventors: Irwin M. Lachman; Carlo Golino, both of Corning, N.Y.

[73] Assignee: Corning Glass Works, Corning, N.Y.

[21] Appl. No.: 712,886

[22] Filed: Mar. 18, 1985

[51] Int. Cl.$^4$ .................. B01J 29/06; B01J 20/12; B01J 21/16; B01J 35/04

[52] U.S. Cl. .................................. 502/64; 502/84; 502/263; 502/355; 502/439; 502/524; 502/527

[58] Field of Search ............... 502/527, 439, 64, 263, 502/351, 355, 524, 84

[56] References Cited

U.S. PATENT DOCUMENTS

| | | | |
|---|---|---|---|
| 2,742,437 | 4/1956 | Houdry | 252/455 |
| 3,565,919 | 2/1971 | Friedrichsen | 260/346.4 |
| 3,824,196 | 7/1974 | Benbow et al. | 252/455 R |
| 4,007,134 | 2/1977 | Liepa et al. | 252/455 Z |
| 4,054,702 | 10/1977 | Lundsager et al. | 502/527 X |
| 4,127,691 | 11/1978 | Frost | 502/527 X |
| 4,151,121 | 4/1979 | Gladrow | 252/455 |
| 4,157,375 | 6/1979 | Brown et al. | 423/212 |
| 4,239,656 | 12/1980 | Fujitani et al. | 252/463 |
| 4,277,376 | 7/1981 | Paolasini | 252/455 R |
| 4,294,806 | 10/1981 | Abe et al. | 423/210 |
| 4,341,663 | 7/1982 | Derleth et al. | 252/463 |

FOREIGN PATENT DOCUMENTS

| | | |
|---|---|---|
| 0012063 | 6/1980 | European Pat. Off. . |
| 1442653 | 8/1969 | Fed. Rep. of Germany . |
| 1555969 | 12/1968 | France . |
| 1064018 | 4/1967 | United Kingdom . |
| 1142800 | 2/1969 | United Kingdom . |
| 1315553 | 5/1973 | United Kingdom . |
| 1565800 | 4/1980 | United Kingdom . |
| 2091239A | 7/1982 | United Kingdom . |

*Primary Examiner*—Carl F. Dees
*Attorney, Agent, or Firm*—R. N. Wardell; G. H. Levin

[57] ABSTRACT

High surface area agglomerates of a porous oxide for the support of catalysts are provided. The agglomerates, in coarse particulate form, are incorporated into a sinterable ceramic structure as a discrete discontinuous phase. The agglomerates provide the high surface area necessary for effective catalyst support within the ceramic structure, which is sintered to provide appreciable density and strength.

22 Claims, No Drawings

PREPARATION OF HIGH SURFACE AREA AGGLOMERATES FOR CATALYST SUPPORT AND PREPARATION OF MONOLITHIC SUPPORT STRUCTURES CONTAINING THEM

BACKGROUND OF THE INVENTION

This invention is directed to monolithic ceramic catalyst supports and particularly to supports which contain a discrete high surface area phase incorporated within the ceramic matrix.

The conventional ceramic monolithic catalyst consists of a ceramic support with a coating of high surface material upon which the catalyst is actually deposited. In particular, the ceramic support is normally prepared by sintering a mold of clay or other ceramic material at a high temperature to impart density and strength. This procedure normally results in a very small surface area, and consequently the ceramic must be coated with another material having a higher surface area, as well as specific chemical characteristics on which to actually deposit the catalyst. This procedure of depositing a high surface area "wash coat" on the low surface area ceramic wall is disclosed, for example, in U.S. Pat. Nos. 2,742,437 and 3,824,196.

Catalyst supports of this kind suffer from several disadvantages. In service, the supports are exposed to a flow of gases which often contain dusts or particulate matter, which can cause the high surface area coating to flake off the underlying ceramic support. This phenomenon can also occur where the support is exposed to thermal cycling because the wash coat and the underlying ceramic material often have different thermal expansion coefficients. Furthermore, catalysts deposited on the high surface area wash coat are susceptible to poisoning, such as by lead or phosphorous in service in automobile converters, and therefore must be periodically regenerated or replaced. It is therefore an object of the present invention to provide a monolithic support having a high surface area which is not easily abraded and which supports catalysts in a manner that resists poisoning. It is a further object of the invention to provide a monolithic support which has good mechanical properties while retaining the porosity and high surface area necessary for proper catalytic functioning. These and other objects are met by the invention to be described.

SUMMARY OF THE INVENTION

The present invention provides a method of preparing high surface area agglomerates and a method of preparing a monolithic support for a catalyst which has a first substantially continuous sintered phase of ceramic material of high strength, and a second discontinuous phase of high surface area material embedded within the ceramic phase. The agglomerated high surface area phase is first prepared separately by mixing (a) a porous oxide having a surface area of at least 20 $m^2/g$ selected from the group consisting of alumina, silica, spinel, zeolite, titania, zirconia, and mixtures of these, and (b) a binder for the oxide; heating the mixture to a temperature up to 250° C. to dry or cure it; and forming the dried or cured mass into coarse particles having a median diameter of 50 to 250 microns. The monolithic support is prepared by mixing 15–50 parts by weight of the particles with 50–85 parts by weight of a ceramic support material; forming this mixture into a honeycomb shape; and heating the shaped mixture to a temperature and for a time sufficient to sinter the ceramic.

The monolithic support prepared in this manner contains a ceramic matrix sintered to a desirable level of strength, and a discontinuous phase of agglomerated porous oxide within the ceramic matrix to provide the high surface area to support catalyst. It has been recognized that the ceramic, although sintered, is itself porous and that the agglomerate particles, even though within the walls of the ceramic, are accessible to the target gas stream and provide suitable surface area and extended catalyst life. The embedded high surface area material, upon which catalytically active materials are deposited, is protected from abrasion, and it is thought that the ceramic acts as a filter, by reaction or adsorption, to eliminate or bind with poisons before they can contact and adversely affect the catalyst itself. Another advantage of the monolithic supports of this invention, compared to those heretofore used, is the lower weight attributable to replacement of the denser ceramic material with the lighter high surface area agglomerates. In those applications requiring the catalyst to be thermally activated and to function quickly, such as in automotive catalytic convertors, the reduced thermal mass in the present monolith permits the "light off" temperature to be reached quickly.

DETAILED DESCRIPTION OF THE INVENTION

As one aspect of the present invention, an agglomerated, high surface area material is prepared separately for subsequent incorporation into the monolithic catalyst support. Preparation is carried out by mixing a porous oxide and a binder for the oxide to form a substantially homogeneous composition. The composition is heated to cure and harden the binder and to drive off other volatiles, and then formed into the coarse particles which will constitute the high surface phase within the ceramic matrix of the present catalyst support.

The porous oxides suitable for use herein are those which, after calcining, have a surface area of at least 20 square meters per gram, preferably at least 60 square meters per gram, and most preferably at least 100 square meters per gram. (As used herein, "calcining" means heating a material to a temperature below that at which the material begins to substantially lose its porosity and surface area.) Preferably the oxide is alumina, silica, a spinel, titania, zirconia, or a zeolite. Mixtures of the oxides can also be used. The invention is not limited to these particular oxides, however, and as those skilled in the art will recognize, the invention contemplates the use of other materials which are commonly used as catalyst supports and which have the above-described characteristics.

The aluminas useful in the preparation of the high surface area agglomerates of this invention are those which, upon calcining, provide gamma-alumina or other transition aluminas having the specified surface area. Colloidal gamma-alumina can be used directly, or "alumina-precursors" such as alpha-alumina monohydrate, or aluminum chlorohydrate can also be used. When alpha-alumina monohydrate is used, the particle size, although not critical, can be from less than 1 micron up to about 100 microns. Suitable commercially available materials of this kind are Kaiser SA substrate alumina, available from the Kaiser Chemical Division of Kaiser Aluminum Corporation, and the Catapal ® aluminas available from the chemical division of Conoco Corporation. The colloidal gamma-alumina is generally in the form of particles not exceeding 1 micron, but size is not critical. The aluminum chlorohydrate is generally in the form of an aqueous solution of aluminum chloride, preferably with an alumina content of at least 20% by weight. Suitable products of this kind are the Chlorohydrol ®, Rehydrol ®, and Rehabond ® alumina products available from Reheis Chemical Company.

Spinels useful in the present invention are the magnesium aluminate spinels heretofore used as catalyst supports, including spinel solid solutions in which magnesium is partially replaced by such other metals as manganese, cobalt, zirconium, or zinc. Preferred spinels are magnesium aluminate spinels having 1-7 percent by weight alumina in excess of 1:1 $MgO.Al_2O_3$ spinel; that is, those having about 72.0-73.5 weight percent $Al_2O_3$ (balance MgO). Spinels of this kind are available on order from Biakowski International Corporation, or can be prepared by co-precipitation or wet-mixing precursor powders of alumina and magnesia, followed by drying and calcining. Such a procedure is described in U.S. Pat. No. 4,239,656, the disclosure of which is hereby incorporated by reference. As a supplement to this disclosure, however, it has been found that calcining of the spinels should normally not exceed 1300° C. for 2-2.5 hours. Calcining temperatures below 1200° C. are preferred. Suitable alumina precursor powders for preparation of the spinels are commercially available as Kaiser SA hydrated alumina or Conoco CATAPAL SB alumina (boehmite alpha-alumina monohydrate). Magnesium oxide component powders found to be suitable are magnesium hydroxide slurry, about 40 weight percent MgO, available from Dow Chemical Company, or hydrated magnesium carbonate.

High surface area silica that can be used in preparing the agglomerates are the amorphous silicas of about 1-10 microns or sub-micron particle size such as CABOSIL EH-5 colloidal silica, available from Cabot Corporation. Silica precursors, such as an aqueous suspension of colloidal silicate, can also be used. High surface area titanias suitable for use in the agglomerates are also commercially available, such as P25 $TiO_2$ available from DeGussa Corporation. Titania precursors such as hydrolyzed titanium isopropoxide can also be used.

The use of zeolites to provide high surface area in various catalytic and molecular sieving operations is well known. Readily-available zeolites useful in the present invention include the crystalline aluminosilicate zeolites with the art-recognized designations A, X, and Y, and silicalite. Zeolites A, X, and Y, and their methods of preparation, are disclosed in U.S. Pat. Nos. 2,882,243; 2,882,244; and 3,130,007; respectively. Disclosures of these patents is incorporated by reference. Silicalite is described in NATURE (271), No. 5645 (1978).

Composites of alumina and silica also can form the basis for the high surface area agglomerates. Alumina-silica composites are commercially available from Davison Chemical Division of W. R. Grace Company and from the Norton Company, or can be prepared by the gel processes as described, for example, in U.S. Pat. Nos. 4,129,522 and 4,039,474. Alternatively, alumina and silica or their precursors can be mixed directly during the preparation of the agglomerates as described below.

When the high surface area material is an alumina, spinel, or a mixture of alumina and silica, it is preferred to add up to about 20 percent by weight (based on the alumina, spinel, or alumina-silica mixture weight) of a rare earth oxide. The preferred rare earth oxides are those of the "cerium subgroup", that is, elements of atomic number 57-62, particularly cerium and lanthanum. Cerium oxide is most preferred. Particularly useful spinels, for example, are those in which about 1 to 20 percent by weight, based on the total spinel weight, of cerium oxide is present. Cerium oxide is incorporated by adding, for example, cerium acetate, cerium carbonate, or cerium nitrate to the other precursor powders during the spinel preparation. In like manner, particularly useful mixtures of alumina and silica are those in which about 5 percent by weight, based on the total alumina and silica dry weight, of cerium oxide is present.

The preferred porous oxides for use in mixing the high surface area agglomerates are the magnesium aluminate spinels and mixtures of 50-93 weight percent alumina and 7-50 weight percent silica, both on a dry calcined basis. The alumina/silica mixtures are particularly preferred.

The agglomerates of this invention are prepared by mixing a porous oxide material as described above with a binder for the oxide. The binder can be any material which will agglomerate the high surface area oxides for preparation of the coarse particles, for embedding in the ceramic monolith as a separate discontinuous phase, but which will normally burn off at or before the sintering temperature of the ceramic. The binder can be any of the well-known materials for this purposes. Examples are thermosetting resins such as epoxies, polyfurfuryl alcohol, silicone resins, phenolic resins, diallyl phthalate, or polyester resins; or a thermoplastic resin such as poly(acrylonitrile), polycarbonates, polyethylene, polymerized ethylenically-unsaturated monomers such as poly(methyl methacrylate) or polystyrene, polyvinyl alcohol, or hydrated methyl cellulose. Most preferred for use as the binder are methyl cellulose, polyvinyl alcohol, or polymerized furfuryl alcohol.

The agglomerates are prepared by combining the high surface area powders with the binder to form a homogeneous or substantially homogeneous mixture. The amount of binder used is such as will cause the powders to mass together. Normally 5-60 parts by weight of binder are used per 100 parts by weight of oxide powder. It is preferred to use only about 5-15 parts by weight, although when polymerized furfuryl alcohol is used, the higher levels are sometimes necessary to thoroughly wet and aggregate the powders.

The binders can be dispersed or dissolved in a suitable diluent, such as water in the case of methyl cellulose and polyvinyl alcohol, and the powders then added to form a thick slurry. When polymerized furfuryl alcohol is to be the binder, it is preferred to polymerize the furfuryl alcohol in situ by mixing sufficient monomeric alcohol to wet the powders and then exposing the resultant mass to the vapors or a mist of an inorganic acid, preferably hydrochloric acid, to polymerize the alcohol. In either case, the mixture of binder and powders is preferably mulled and then extruded to effect further mixing. Extrusion is generally into a shape, preferably "noodle" shape, which will facilitate drying of the extruded mass. The noodles, can be, for example, ribbon-like or tubular, or can be solid with circular or polygonal cross-section. As used herein, "drying" includes curing the binder, as may be necessary, or driving off any volatiles which may be present in the binder. Accordingly, the mass is dried at a temperature below the sintering temperature of the powders, preferably at room temperature up to about 250° C., and then pulverized to form the coarse particulate agglomerates of the invention. Any conventional pulverization techniques can be used, but use of a jaw crusher is preferred to attain the desired particle sizes. The particle sizes are preferably such that the median particle diameter is 50–250 microns, more preferably 55–100 microns. Generally, however, the particles are of a size that will not interfere with the subsequent preparation of the ceramic monolith but will result in the presence of a discernible discontinuous phase in the ceramic matrix.

The most preferred agglomerates of this invention are those based on magnesium aluminate spinels and mixtures of alumina and silica. The most preferred binders are methyl cellulose and polymerized furfuryl alcohol where the polymerization takes place in the presence of the high surface area powders.

A second aspect of the present invention is the monolithic support which incorporates the agglomerates as a high surface area phase. The ceramic matrix, which forms the high-strength support phase of the monolith, is comprised of any of the well known sinterable materials capable of providing mechanical strength and good thermal properties in monolithic supports as heretofore prepared by those skilled in the art. Preferably the ceramic is selected from cordierite, mullite, clay, talc, zirconia, zirconia-spinel, alumina, silica, lithium aluminosilicates, and alumina-zirconia composites. Mixtures of these can also be used to the extent that the chosen materials are compatible and will not degrade each other, as those skilled in the art will recognize.

Unless otherwise described, the ceramic materials mentioned above are in their commonly utilized form. For purposes of this invention, however, particular points about the ceramic materials should be noted. Cordierite, although it can be in the precursor or "raw" form which becomes true cordierite upon heating, is preferably pre-reacted. When raw cordierite is used, it is preferred that up to 10% by total weight of $B_2O_3$ be added to the raw batch. The zirconia-based ceramics used in the present invention are preferably those made directly from baddeleyite ore concentrates, as described in U.S. Pat. No. 4,461,843 to McGarry et al, but can be prepared by any conventional methods. The alumina-zirconia composites useful as the ceramic in this invention are preferably those based on alpha-alumina and monoclinic zirconia, having 2–50 percent by weight zirconia. These composites can be prepared by methods known in the art. The preferred clay is kaolin.

The ceramic material can contain substantial amounts of a component which causes intracrystalline and intercrystalline microcracking to occur. Such microcracking enhances the thermal shock resistance of monolithic supports based on these ceramics and is therefore desirable when the monoliths, in service, may be exposed to rapid changes in temperature. Ceramic materials which contain such a component, and are therefore contemplated for use within the present invention are disclosed in U.S. Pat. Nos. 3,528,831; 3,549,400; and 3,578,471; all issued to I. M. Lachman. A preferred microcracking agent for addition to the ceramic material, is aluminum titanate, which is normally incorporated into the ceramic matrix as a "solid solution" with the basic ceramic material. An aluminum titanate solid solution with mullite is disclosed in U.S. Pat. No. 4,483,944 to Day, et al. The disclosures of the four above-mentioned patents are incorporated herein by reference.

The monolithic supports are prepared by mixing the sinterable ceramic materials with the agglomerate materials described above and, optionally, a binder. Commercially available agglomerated high-surface area particles can also be used. Examples are Alcoa Corporation's F-1 boehmite agglomerates (Surface area 210 $m^2/g$; particles −100 mesh) or H-151 alumina (surface area 390 $m^2/g$; particles −100 mesh). Generally about 15–50 parts by weight of the agglomerate particles will be combined with 50–85 parts by weight of the ceramic material. Preferably, 3–20 parts by weight of binder will also be used. Any binder material conventionally used in ceramic catalyst support manufacture is suitable. Examples are disclosed in:

"Ceramics Processing Before Firing,"ed. by George Y. Onoda, Jr. & L. L. Hench, John Wiley & Sons, New York "Study of Several Groups of Organic Binders Under Low-Pressure Extrusion," C. C. Treischel & E. W. Emrich, *Jour. Am. Cer. Soc.*, (29), pp. 129–132, 1946

"Organic (Temporary) Binders for Ceramic Systems," S. Levine, *Ceramic Age*, (75) No. 1, pp. 39+, January 1960

"Temporary Organic Binders for Ceramic Systems," S. Levine, *Ceramic Age*, (75) No. 2, pp. 25+, February 1960

Preferred are methyl cellulose or a silicone resin. The silicone resins preferred for use are Dow Corning Corporation's Q6-2230 silicone resin or those described in U.S. Pat. No. 3,090,691 to Weyer. The most preferred binder is methyl cellulose, available as Methocel ® A4M from the Dow Chemical Company. Up to about 1 percent by weight, based upon total mixture weight, of a surfactant, such as sodium stearate, can also be used to facilitate mixing and flow for subsequent processing. The mixing step should be performed in a liquid, such as water, which acts as a further plasticizer. When the binder is a silicone resin, it is preferred to use isopropyl alcohol in addition to water.

The most preferred ceramic materials for use in this invention are the pre-reacted cordierite and mullite, including mullite with a microcracking agent. The ceramic material should be in particulate form, preferably of a size finer than 200 mesh (U.S. Standard) and most preferably finer than 325 mesh (U.S. Standard). The ceramic particles can be coarser, but should be at least as fine as the agglomerate particles. With such characteristics, the ceramic material can normally be sintered at temperatures below those at which the surface area of the agglomerates would be adversely affected.

The monoliths are prepared by combining the components to form a homogeneous or substantially homogeneous mixture. Conventional mixing equipment can be used, but the use of a mix muller is preferred, especially when plasticizing with water or isopropyl alcohol. To effect further mixing, the batch can subsequently be extruded through a "noodling" die one or more times. Ultimately, the batch is formed into a honeycomb shape, preferably by extrusion through a die.

Finally, the honeycomb shapes are heated to a temperature and for a time sufficient to sinter the ceramic material. Optionally, this heating/sintering step can be preceeded by drying the honeycombs at about 100°–120° C. The heating/sintering generally takes place at 800°–1200° C., although when silicone resin is used as a binder for the ceramic matrix, particularly when the ceramic has a high alumina content, temperatures as low as 500° C. may be sufficient. With the retention of high surface area by the agglomerates, despite the temperatures used to sinter the ceramic, the monolithic support preferably has an overall surface area of at least 8-10 square meters per gram, preferably at least 15-20 m²/g.

The monolithic supports of this invention may have some catalytic activity of their own by virtue of the chemistry and structure of the high surface area phase. The support may further carry additional catalytically active ingredients dispersed throughout, but generally more concentrated at the high surface area sites provided by the agglomerates. These additional catalytic ingredients can be incorporated into the monolith by methods known in the art. Preferably, these ingredients will be deposited onto the agglomerates after combining the agglomerates with the ceramic material, and fabricating and sintering the final structure.

The monolithic supports of this invention are useful in most applications in which it is necessary to catalytically convert undesirable components in a gas stream prior to the stream's further processing or exhaustion to the atmosphere. The supports have good thermal shock resistance, particularly when the ceramic matrix phase is microcracked, and are therefore useful in applications in which they might be exposed to rapid and frequent changes in temperature. Capability to withstand thermal shock makes the supports of this invention particularly well suited for catalyzing the conversion of truck or automotive exhaust gasses to less noxious forms.

The following examples illustrate various embodiments of the invention. A particularly preferred embodiment is shown in Example 3. The examples are intended to be illustrative, but not limiting, of the invention.

EXAMPLE 1

In the following parts A-C of this example, high surface area agglomerates based on alumina and silica were prepared. The alumina ingredient was Kaiser SA Substrate Alumina, a hydrated alumina which, after heat treatment at 600° C. for one hour, has a weight loss-on-ignition of 27 percent and provides gamma-alumina having a surface area of 300 m²/g. The silica ingredient was CABOSIL EH-5 silica (Cabot Corp.), an amorphous silica having a surface area of 400 m²/g and a median crystallite size of 0.007 microns.

EXAMPLE 1A 93.3 parts by weight of the alumina and 6.72 parts by weight of the silica were pre-mixed in a plastic jar on a roller for two hours. About 6 percent by weight of methyl cellulose, based on the alumina-silica total weight, was dispersed separately in distilled water which had been heated to 80° C. When the methyl cellulose was sufficiently dispersed, the alumina-silica mixture was added. The resultant mixture was stirred by hand and additional water was added, bringing the total water content to 90 parts by weight, until a thick slurry was produced. The slurry was dried overnight at 175° C. to form a hard cake. The cake was crushed into particles of various dimensions for use in Examples 2-5, following.

EXAMPLE 1B

The procedure of Example 1A was repeated except that polyvinyl alcohol was substituted for the same weight of methyl cellulose. The slurry produced by this procedure was dried at 175°-200° C. until a hard cake was obtained. The cake was capable of being crushed into particles.

EXAMPLE 1C 93.3 parts by weight of the alumina and 6.72 parts by weight of the silica were pre-mixed in a plastic jar on a roller for two hours. Sufficient monomeric furfuryl alcohol was added to this dry mixture to wet the mixture and enable it to be mixed by hand to form a thick mass. The mass, while still wet, was placed in a partially closed container in contact with the vapor from an agitated solution of aqueous hydrochloric acid, 50 percent weight strength, to polymerize the alcohol. After polymerization, the agglomerate batch was heated to 250° C. for six hours to drive off the volatiles. A hard cake was produced which was capable of being crushed into particles.

EXAMPLES 2-6

In these examples, compositions of the following ingredients were prepared, as described below in Table A, for the fabrication of honeycomb monolithic supports. Figures represent parts by weight.

TABLE A

| INGREDIENT | EXAMPLE 2 | EXAMPLE 3 | EXAMPLE 4 | EXAMPLE 5 | EXAMPLE 6 |
| --- | --- | --- | --- | --- | --- |
| Methyl Cellulose | 4 | 4 | 4 | 4 | 4 |
| Sodium Stearate | 0.5 | 0.5 | 0.5 | 0.5 | 0.5 |
| Distilled Water | 43.8 | 40.6 | 41.3 | 46.9 | 38.8 |
| Pre-reacted Cordierite | | | | | |
| m.p.s.* 7.9 microns | 50.0 | 60.0 | 60.0 | — | 32.11 |
| m.p.s.* 6.8 microns | 10.0 | — | — | — | — |
| Example 1A Agglomerates | | | | | |
| m.p.s.* 80.5-84 microns | 40.0 | 40.0 | — | — | — |
| m.p.s.* 62 microns | — | — | 40 | 45.6 | — |
| particles finer than 200 mesh | — | — | — | — | 34.1 |
| Kaolin (Georgia-Kaolin Co. Hydrite ®) | — | — | — | 9.9 | — |
| Calcined Kaolin (Georgia-Kaolin Co. Glomax LL) | — | — | — | 8.4 | — |
| Talc (Pfizer MP96-28) | — | — | — | 26.9 | — |
| Hydrated Alumina (Alcoa Hydral 710) | — | — | — | 8.2 | — |
| Boric Acid | — | — | — | 1.0 | 0.86 |
| Kaolin (Kaopaque 10. Georgia-Kaolin Co.) | — | — | — | — | 21.45 |
| Sodium Silicate (Phila. Quartz Co. S-35) | — | — | — | — | 6.69 |

TABLE A-continued

| INGREDIENT | EXAMPLE 2 | EXAMPLE 3 | EXAMPLE 4 | EXAMPLE 5 | EXAMPLE 6 |
|---|---|---|---|---|---|
| $Mg(OH_2)$(Fisher Chemical Co. M-42) | — | — | — | — | 4.78 |

*median particle size

For each example, the compositions were formulated by combining all ingredients but the water in a plastic jar. The jar contained 1-inch diameter balls from a standard ball mill, 6 balls per 800 grams of material. The jar was rotated until the ingredients were well mixed, after which the ingredients were placed in a mix muller with the water and further mixed until a plasticized batch was attained. The batch was extruded several times through a noodle die to distribute the agglomerate particles throughout the mixture. The compositions of Examples 2, 3, and 6 were extruded through a die to produce honeycomb shapes having 200 square openings per square inch with a wall thickness of 12 mils. The compositions of Examples 4 and 5 were extruded through a die to produce honeycomb shapes having 400 square openings per square inch with a wall thickness of 5 mils. Honeycomb shapes of each example/composition were heated at various temperatures between 1000°–1200° C. for four hours to sinter the ceramic material. Agglomerate particles of Example 1A were also separately heated so that their characteristics could be ascertained. The physical characteristics, according to heating temperatures of the monoliths and agglomerates above, are shown in Table B.

TABLE B

| EXAMPLE | Heating Temp (°C.) 4 Hours | Porosity Percent[1] | Thermal Expansion Coefficient RT-1000° C. | Axial Crushing Strength (PSI) | BET Surface Area ($m^2/g$) |
|---|---|---|---|---|---|
| 2 | 1000 | — | — | — | 60 |
|   | 1100 | 47 | 30 | 350 | 33 |
|   | 1150 | 46 | 27 | 450 | 17 |
|   | 1200 | 48 | 29 | — | 7 |
| 3 | 1000 | — | — | — | 55.5 |
|   | 1100 | 42 | 32 | 840 | 39 |
|   | 1150 | 43 | 34 | 1080 | 19 |
|   | 1200 | 44 | 30 | 2020 | 8.5 |
| 4 | 1000 | — | — | — | 57 |
|   | 1100 | 39 | 28 | 350 | 35.5 |
|   | 1200 | 43 | 31 | 550 | 10.5 |
| 5 | 1000 | — | — | — | 62 |
|   | 1100 | 46 | — | — | 40 |
|   | 1150 | 45 | — | — | 23.5 |
|   | 1200 | 41 | — | — | 15 |
| 6 | 1040 | 43 | 37 | 1150 | 33 |
|   | 1100 | 45 | 38 | 2230 | 25.8 |
|   | 1150 | 45 | 37 | 2400 | 11.1 |
|   | 1200 | 42 | 36 | — | 6.4 |
| 1A | 1100 | — | — | — | 100 |
|   | 1150 | — | — | — | 80 |
|   | 1200 | — | — | — | 54 |

[1]Measured with a Mercury Porosimeter.
[2]Measured with a sapphire dilatometer (cm/cm °C.).

EXAMPLE 7

93.3 parts by weight of the alumina and 6.7 parts by weight of the silica used in example 1 were dry mixed, and the mixture then blended with sufficient distilled water to form a thick slurry, after which 9.0 parts by weight of cerium nitrate were added. The resultant slurry was dried at about 175° C. to form a hard cake, which was then crushed into particles, −100 mesh. The composition of the agglomerates, calculated after ignition loss, is 87.0% $Al_2O_3$; 8.37% $SiO_2$; 4.6% $CeO_2$.

EXAMPLES 8-10

In these examples, compositions of the following ingredients were prepared, as described below in Table C, for the fabrication of honeycomb monolithic supports. Figures represent parts by weight.

TABLE C

| INGREDIENT | EXAMPLE 8 | EXAMPLE 9 | EXAMPLE 10 |
|---|---|---|---|
| Methyl Cellulose | 6.0 | 4.0 | 6.0 |
| Distilled Water | 12.7 | 14.1 | 53.3 |
| Isopropyl Alcohol | 12.7 | 14.1 | — |
| Sodium Stearate | — | 0.5 | 0.5 |
| Kaolin (Hydrite[R], Georgia-Kaolin Co.) | — | 6.65 | 11.0 |
| Pre-reacted cordierite, -100 mesh powder | 52.0 | — | — |
| Low surface-area alumina (Reynolds-152 DMB) | — | 5.12 | — |
| Mullite/aluminum titanate solid solution (50/50) pre-reacted, m.p.s.* 7.0 microns | — | 42.82 | — |
| Mullite-zirconia grain Carbomul HM, -200 mesh powder, Carborundum Co.) | — | — | 33.0 |
| Alumina, Alcoa F-1, -325 mesh powder | — | — | 9.11 |
| Zirconia, 5 micron particles | — | — | 9.94 |
| Silicone Resin, Dow Corning Q6-2230 | 16.0 | 16.0 | — |
| High surface area gamma-alumina agglomerates | | | |
| Alcoa F-1, -100 mesh powder, 210 $m^2/g$ | 32.0 | — | — |
| Alcoa H-151, -100 mesh powder, 390 $m^2/g$ | — | 29.4 | — |
| Example 7 Agglomerates m.p.s., 72 microns | — | — | 36.8 |

*median particle size

For each example, the compositions were formulated by combining all ingredients but the water and isopropyl alcohol (Exs. 8 and 9) in a Littleford intensive mixer. The ingredients were mixed until a substantially homogeneous dry mix was attained, after which the mixture was transferred to a mix muller and combined with the water and alcohol until a plasticized batch was attained. The batch was extruded several times through a noodle die to distribute the agglomerate particles through the mixture. The compositions were then extruded through a die to produce honeycomb shapes having 200 square openings per square inch with a wall thickness of 12 mils. Honeycomb shapes of each example/composition were heated at various temperatures between 1000°-1200° C. for six hours to sinter the ceramic material. Agglomerate particles of Example 7 were also separately heated to determine the effect of temperature on their surface area. The physical characteristics, according to heating temperatures, are shown in Table D.

TABLE D

| Example | Heating Temp. (°C.) | BET Surface Area (m²/g) |
|---|---|---|
| 7 | 1000 | 130 |
|   | 1100 | 96 |
|   | 1150 | — |
|   | 1200 | 32 |
| 8 | 1000 | 31 |
|   | 1100 | — |
|   | 1150 | 8 |
|   | 1200 | — |
| 9 | 1000 | 35 |
|   | 1100 | — |
|   | 1150 | — |
|   | 1200 | 1.8 |
| 10 | 1000 | 55.9 |
|   | 1100 | 36.1 |
|   | 1150 | 26.7 |
|   | 1200 | 15.0 |

We claim:

1. A method of preparing a monolithic catalyst support structure having a first substantially continuous high-strength ceramic phase and a second discontinuous catalyst-support phase of high surface area porous oxide embedded therein comprising:
   (a) mixing into a substantially homogenous body (i) a high surface area porous oxide having a surface area of at least 20 m²/g selected from the group consisting of alumina, silica, spinel, titania, zeolite, zirconia, and mixtures of these; and (ii) a first binder for the oxide, said binder being capable of agglomerating said oxide;
   (b) drying the body;
   (c) forming the body into particles having a median diameter of 50-250 microns;
   (d) mixing 15-50 parts by weight of the particles of porous oxide so formed, 50-85 parts by weight of a ceramic matrix material, in particulate form, and 3-20 parts by weight of a second binder;
   (e) forming the mixture of step (d) into a honeycomb shape such that said ceramic material forms a substantially continous matrix phase in which said porous oxide particles are embedded; and
   (f) heating the shaped mixture at a temperature sufficient to sinter the ceramic material.

2. A method of claim 1 in which the binder for the oxide is a silicone resin, polymerized furfuryl alcohol, methyl cellulose, polyvinyl alcohol, or a mixture of these.

3. A method of claim 1 in which the ceramic material is cordierite, mullite, clay, talc, zirconia, zirconia-spinel, alumina, silica, lithium aluminosilicates, alumina-zirconia composites, or mixtures of these, and in which the ceramic material has a particle size finer than 200 mesh.

4. A method of claim 3 in which the ceramic material of step (d) is cordierite, the porous oxide of step (a) is a spinel or a mixture of alumina and silica, the binder of step (a) is polymerized furfuryl alcohol, and in which step (a) includes the sub-steps of (1) mixing the porous oxide material into monomeric furfuryl alcohol, and (2) contacting the mixture so formed with an aqueous inorganic acid to polymerize the alcohol.

5. A method of claim 3 in which the porous oxide of step (a) is a spinel or a mixture of alumina and silica, the binder of step (a) is methyl cellulose, and the ceramic material of step (d) is cordierite.

6. A method of claim 1 in which the ceramic material contains a component capable of causing microcracking to occur in the ceramic phase.

7. A monolithic-catalyst support structure prepared by the method of claim 1.

8. A monolithic-catalyst support structure support prepared by the method of claim 2.

9. A monolithic-catalyst support structure support prepared by the method of claim 3.

10. A monolithic-catalyst support structure support prepared by the method of claim 4.

11. A monolithic-catalyst support structure support prepared by the method of claim 5.

12. A monolithic-catalyst support structure support prepared by the method of claim 6.

13. A method of preparing a monolithic catalyst support structure having a first substantially continuous high-strength ceramic phase and a second discontinuous catalyst-support phase of high surface area porous oxide embedded therein comprising:
   (a) mixing (i) 15-50 parts by weight of particles having a median diameter of 50-250 microns, which particles are comprised of a high surface area porous oxide having a surface area of at least 20 m²/g selected from the group consisting of alumina, silica, spinel, titania, zeolite, zirconia, and mixtures of these, (ii) 50-85 parts by weight of a ceramic matrix material in particulate form, and (iii) 3-20 parts by weight of a binder;
   (b) forming the mixture into a honeycomb shape such that said ceramic material forms a substantially continuous matrix phase in which said porous oxide particles are embedded; and
   (c) heating the shaped mixture at a temperature sufficient to sinter the ceramic material.

14. A catalyst support prepared by the method of claim 13.

15. A monolithic catalyst support structure having a first substantially continuous high-strength ceramic phase and a second discontinuous catalyst-support phase of high surface area porous oxide embedded therein, the catalyst support structure being characterized in that (1) said high surface area catalyst-support phase consists of a porous oxide selected from alumina, spinel, silica, titania, zeolite, zirconia, or mixtures or these, (2) said high surface area catalyst-support phase is in the form of agglomerates having a median diameter of 50-250 microns and a surfaces area of at least 20 m²/g, and (3) the structure contains 50-85 parts by weight of the ceramic phase and 15-50 parts by weight of the high surface area porous oxide phase.

16. A catalyst support of claim 15 wherein the sintered ceramic phase consists of cordierite, mullite, clay, talc, zirconia, zirconia-spinel, alumina, silica, lithium aluminosilicate, alumina-zirconia composite, or mixture of these.

17. A catalyst support of claim 15 wherein the ceramic phase is cordierite.

18. A catalyst support of claim 16 in which the high surface area phase consists of alumina, silica, spinel, or mixtures of these.

19. A catalyst support of claim 17 in which the high surface area phase consists of alumina, silica, spinel, or mixtures of these.

20. A catalyst support of claim 19 in which the high surface area phase is alumina.

21. A catalyst support of claim 19 in which the high surface area phase is spinel.

22. A catalyst support of claim 19 in which the high surface area phase is a mixture of alumina and silica.

* * * * *

UNITED STATES PATENT AND TRADEMARK OFFICE
CERTIFICATE OF CORRECTION

PATENT NO. : 4,657,880                 Page 1 of 2

DATED : April 14, 1987

INVENTOR(S) : Irwin M. Lachman et al

It is certified that error appears in the above-identified patent and that said Letters Patent is hereby corrected as shown below:

Column 12, line 53, before "catalyst" insert -- monolithic --.

Column 12, line 53, after "support" insert -- structure --.

Column 13, line 1, delete "catalyst support" and insert
-- monolithic catalyst support structure --.

Column 13, line 6, delete "catalyst support" and insert
-- monolithic catalyst support structure --.

Column 13, line 8, delete "catalyst support" and insert
-- monolithic catalyst support structure --.

Column 14, line 1, delete "catalyst support" and insert
-- monolithic catalyst support structure --.

Column 14, line 4, delete "catalyst support" and insert
-- monolithic catalyst support structure --.

Column 14, line 6, delete "catalyst support" and insert
-- monolithic catalyst support structure --.

UNITED STATES PATENT AND TRADEMARK OFFICE
CERTIFICATE OF CORRECTION

PATENT NO. : 4,657,880               Page 2 of 2

DATED      : April 14, 1987

INVENTOR(S) : Irwin M. Lachman et al

It is certified that error appears in the above-identified patent and that said Letters Patent is hereby corrected as shown below:

Column 14, line 8, delete "catalyst support" and insert
-- monolithic support structure --.

Signed and Sealed this

Twenty-fifth Day of August, 1987

Attest:

DONALD J. QUIGG

Attesting Officer          Commissioner of Patents and Trademarks